March 11, 1930.  E. V. WILLS  1,750,079
TOOL
Filed June 7, 1928
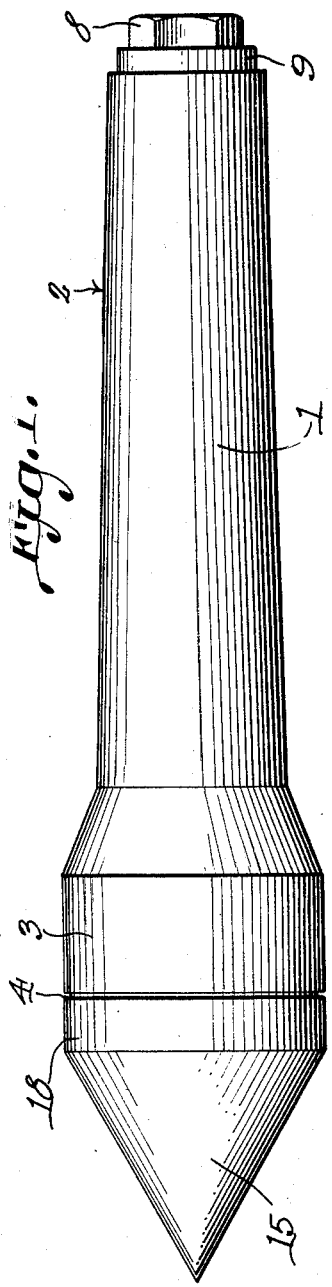
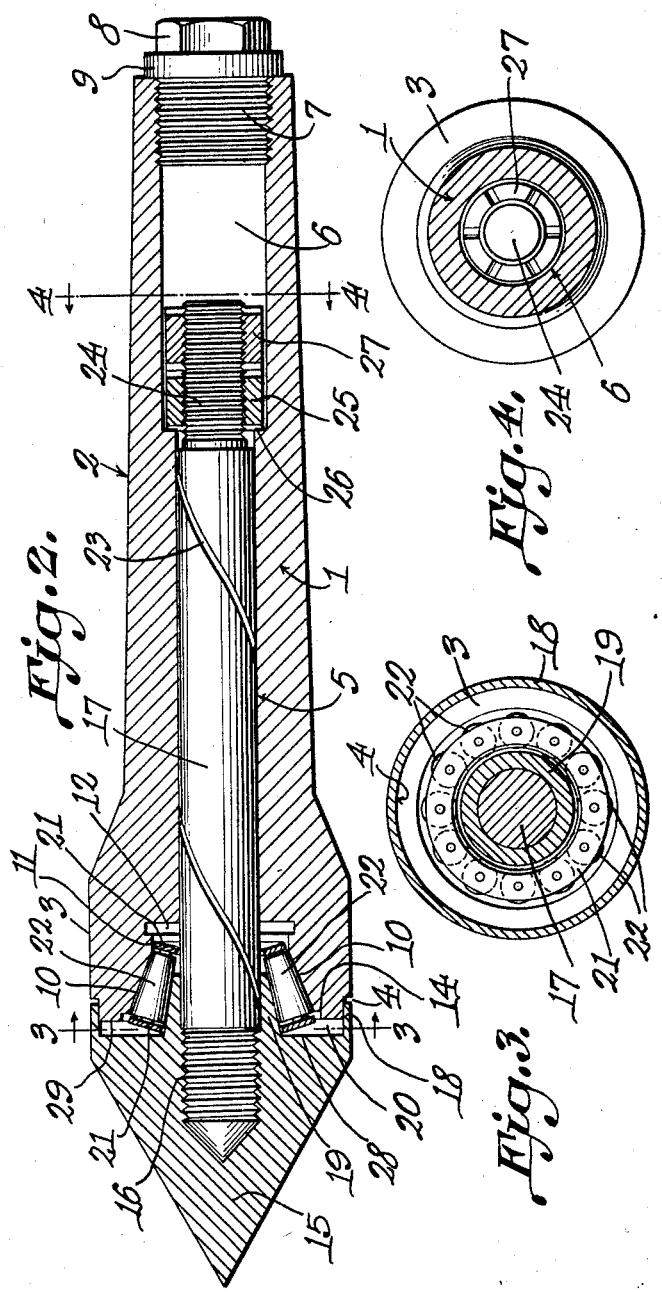
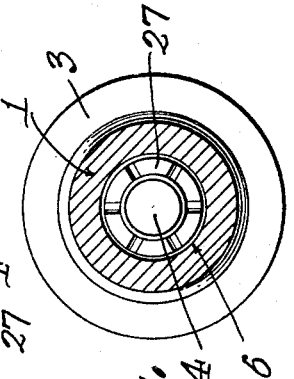
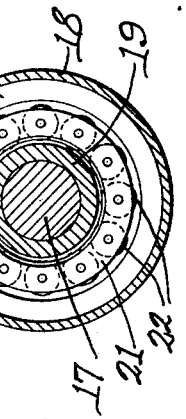
E. Vernon Wills
Inventor
By C. A. Snow & Co.
Attorneys Patented Mar. 11, 1930

1,750,079

UNITED STATES PATENT OFFICE

ELLIS VERNON WILLS, OF ST. LOUIS, MISSOURI

TOOL

Application filed June 7, 1928. Serial No. 283,596.

This invention aims to provide a center for metal turning lathes, especially, but adapted to be used, also, in high speed wood turning lathes, the construction of the device being such that it will be well adapted to withstand heavy thrust and operate under a considerable load, without much friction, novel means being provided for taking up radial wear.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in side elevation, a device constructed in accordance with the invention;

Figure 2 is a longitudinal section;

Figures 3 and 4 are sections taken respectively on the lines 3—3 and 4—4 of Figure 2.

The tool forming the subject matter of this application comprises a body 1 which is tapered as shown at 2. The body 1 has an enlarged end 3 provided at one extremity with an external circumferential recess 4. The body 1 has a cylindrical longitudinal bore 5 at the inner end of which there is an enlarged chamber 6, forming a shoulder 26. A closure plug 7 is threaded into the smaller end of the body 1 and has a wrench head 8. The closure plug 7 is supplied with an outstanding flange 9 adapted to engage the end of the body 1. In the forward end of the part 3 of the body 1 there is a conical ball race 10, at the inner end of which there is a cylindrical bore 11 communicating with an enlarged space 12 in the body 1.

In the forward end of the part 3 of the body 1 there is an enlarged space 14. The numeral 15 designates a centering piece into which is threaded at 16, a shaft 17 journaled for rotation in the bore 5 of the body 1. The centering piece 15 has a marginal flange 18 within which the forward end of the part 3 of the body 1 is received, the flange 18 fitting within the recess 4 of the part 3 of the body 1. The centering piece 15 has a rearwardly extended neck 19, the outer surface of which is conical. The neck 19 extends backwardly within the conical race 10 of the body. The space between the rear end wall 28 of the centering piece 15 and the forward end wall 29 of the body 1 forms a lubricant compartment 20.

A means is provided for supporting the centering piece 15 and the shaft 17 for antifrictional rotation. With this end in view, a roller bearing is provided, the same including frames 21, and rollers 22 carried thereby. The inner one of the frames 21 is disposed in the cylindrical bore 11 of the body 1, and the forward one of the frames 21 is received in the space 14 and extends into the lubricant compartment 20. The shaft 17 is provided with a continuous spiral oil groove 23, one end of which extends across the space at 12 and across the bore at 11. The rear end of the groove 23 is in communication with the chamber 6.

On its rear end, the shaft 17 has a reduced stem 24 on which is threaded a nut 25 adapted to cooperate with the shoulder 26, the nut 25 being held in place by a lock nut 27 which is threaded on the stem 24.

In practical operation, the roller bearing 22—21 is mounted in place, as shown in Figure 3. The shaft 17 is inserted backwardly through the bore 5. The nut 25 is threaded on the stem 24 and cooperates with a shoulder 26 to draw a shaft 17 backwardly until the conical neck 19 of the part 15 cooperates properly with the roller bearing, and until there is no objectionable longitudinal play in the shaft 17. Then the lock nut 27 is mounted in place and threaded up against the nut 25.

The chamber 6 is filled with a lubricant, and when the closure plug 7 is threaded into the end of the body 1, the grease in the compartment 6 will be forced forward through the spiral groove 23 in the shaft 17. The grease will be deposited in the space at 12, and in the bore 11. The rollers 22 will be adequately lubricated, and the surplus grease will find its way forward into the compartment shown at 20. By providing the closure plug 7 with the flange shown at 9, the strain will be taken off the threads of the plug 7, to a large extent, when the closure plug is struck on its outer end to drive the body 1 out of the tail stock of the lathe.

The device forming the subject matter of this application is a heavy duty thrust roller bearing, which will outlast many devices in which ball bearings are used. The structure forming the subject matter of this application will withstand wear, due to a thrust load, owing to the particular way in which the rollers 22 cooperate with the race 10 and with the conical surface of the neck 19. The spindle 17 has a ground fit in the bore 5 of the body 1, and as a result, the center 15 is kept in perfect alinement.

What is claimed is:—

1. In a device of the class described, a body provided at one end with a lubricant chamber, a shaft journaled in the body, a centering piece carried by the one end of the shaft and cooperating with the body, bearings mounted in the body and supporting the centering piece for rotation, and the shaft having a superficial spiral groove by which a lubricant is fed from the chamber to the bearings when the centering piece and the shaft rotate.

2. A tool of the class described, comprising a body, a closure for the rear end of the body, a shaft journaled in the body, means on the shaft and housed within the body for holding the shaft for rotation in the body, there being a lubricant chamber between the closure and said means, a centering piece secured to the forward end of the shaft, and a bearing interposed between the centering piece and the body, the tool having a space for lubricant at one end of the bearing, and the shaft being provided with means for conducting lubricant from the chamber to said space.

3. A tool of the class described, comprising a body provided in its forward end with a race, a closure for the rear end of the body, a shaft journaled in the body, means on the shaft and housed within the body for holding the shaft for rotation in the body, there being a lubricant chamber between the closure and said means, a centering piece secured to the forward end of the shaft and having a rearwardly extended integral neck prolonged within the race, a bearing located between the neck and the race, the body having a first space for lubricant, located at the rear end of the bearing, and there being a space for overflow lubricant at the forward end of the bearing, between the rear end of the centering piece and the forward end of the body, the centering piece being provided with a flange surrounding the forward end of the body and constituting the outer wall of said overflow space, and the shaft having means for carrying lubricant from the chamber to the first space.

In testimony that I claim the foregoing as my own, I have hereto affixed my signature.

ELLIS VERNON WILLS.